（12）United States Patent
Dakshinkar et al.

(10) Patent No.: US 12,341,675 B2
(45) Date of Patent: Jun. 24, 2025

(54) STRATEGY TO ENSURE CONTINUAL USER EXPERIENCE AND SYSTEM PERFORMANCE IF AN UPLINK IS STUCK

(71) Applicant: HEWLETT PACKARD ENTERPRISE DEVELOPMENT LP, Spring, TX (US)

(72) Inventors: Abhiruchi Dakshinkar, Santa Clara, CA (US); Shubham Saloni, Santa Clara, CA (US); Wei Hu, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 407 days.

(21) Appl. No.: 18/076,099

(22) Filed: Dec. 6, 2022

(65) Prior Publication Data

US 2024/0187322 A1    Jun. 6, 2024

(51) Int. Cl.
 *H04L 43/0829* (2022.01)
 *H04W 24/08* (2009.01)
 *H04W 76/30* (2018.01)

(52) U.S. Cl.
 CPC ......... *H04L 43/0829* (2013.01); *H04W 24/08* (2013.01); *H04W 76/30* (2018.02)

(58) Field of Classification Search
 None
 See application file for complete search history.

(56) References Cited

U.S. PATENT DOCUMENTS

| 7,903,817 | B2 | 3/2011 | Cam-Winget et al. |
| 8,194,543 | B2 | 6/2012 | Dinescu |
| 8,369,830 | B2 | 2/2013 | Sperti et al. |
| 8,826,413 | B2 | 9/2014 | Vijayakumar et al. |
| 9,270,609 | B2 | 2/2016 | Adiraju et al. |
| 9,414,248 | B2 | 8/2016 | Kovvali et al. |
| 10,057,812 | B2 | 8/2018 | Szilagyi et al. |
| 2010/0074111 | A1 | 3/2010 | Krishnaprasad et al. |

(Continued)

FOREIGN PATENT DOCUMENTS

| WO | 2007/061167 A1 | 5/2007 |
| WO | 2018/087721 A1 | 5/2018 |

*Primary Examiner* — Angela Nguyen
(74) *Attorney, Agent, or Firm* — Sheppard Mullin Richter & Hampton LLP

(57) ABSTRACT

In a computer network, communication connections may be established between client devices and network devices. An algorithm may be generated and used as a method to identify and resolve issues with Uplink communications between client devices and network devices. When an issue with an Uplink communication is identified, a total number of issues with the communication may be determined. Determining that the total number of issues with a communication is greater than a threshold, the client device associated with the communication may be deauthenticated from the respective network device. After a client device is deauthenticated from a network device, the total number of deauthentications may be determined with the network device. Determining the total number of deauthentications with a network device is greater than a threshold, the radio of the network device may be disabled to deauthenticate all connected client devices. Solutions may be implemented according to the issues identified.

20 Claims, 6 Drawing Sheets

(56) References Cited

U.S. PATENT DOCUMENTS

2014/0112156 A1* 4/2014 Wen .................. H04W 24/08
                                                    370/242
2018/0092147 A1* 3/2018 Pelletier ............ H04W 12/06
2024/0187139 A1* 6/2024 Liu .................... H04L 1/1614

* cited by examiner

Computing Component 400

Hardware Processors 402 

Machine-Readable Storage Media 404

Sending a Query Message Requesting a Response Indicating if a First Client Device is Sending At Least One Data Packet to a First Network Device
408

Determining a First Response Message is Received by the First Network Device from the First Client Device
410

Determining a Failure Count Indicating the Number of Failed Attempts in Sending Data Packets from the First Client Device to the First Network Device
412

Increasing the Failure Count by One when Determining No Data Packets Have Been Received by the First Network Device from the First Client Device
414

Determining the Failure Count is Greater than a Failure Count Threshold
416

Deauthenticating the First Client Device from the First Network Device when the Failure Count is Greater Than the Failure Count Threshold
418

FIG. 4

STRATEGY TO ENSURE CONTINUAL USER EXPERIENCE AND SYSTEM PERFORMANCE IF AN UPLINK IS STUCK

BACKGROUND

With the advancement of technology, electronic communication has become a primary and staple form of communication that is used across various fields, for various purposes. Network devices are key components in electronic communication systems that allow for the communication and interaction between various devices. Each network device may have their own functions and applications to contribute to providing successful electronic communications on a computer network.

While more network devices are being created to continue to advance the capabilities of electronic communication, there is still an ongoing issue with data traffic congestion between network devices and client devices in a network. For instance, data traffic congestion may occur at the transmitter and/or receiver of a network device that prevents data from being transmitted and/or received between devices in a network. These data traffic congestions may cause issues with the network capacity, leading to connectivity issues and underprovisioning of resources which may ultimately result in the complete collapse of the network.

BRIEF DESCRIPTION OF THE DRAWINGS

The present disclosure, in accordance with one or more various embodiments, is described in detail with reference to the following figures. The figures are provided for purposes of illustration only and merely depict typical or exemplary examples. These figures are provided to facilitate the reader's understanding of the disclosed technology and shall not be considered limiting of the breadth, scope, or applicability thereof. It should be noted that for clarity and ease of illustration these drawings are not necessarily made to scale.

FIG. 4 is an example illustration of a server determining whether an uplink data traffic between a network device and a client device is stuck in accordance with various embodiments of the present disclosure.

Figure 1:
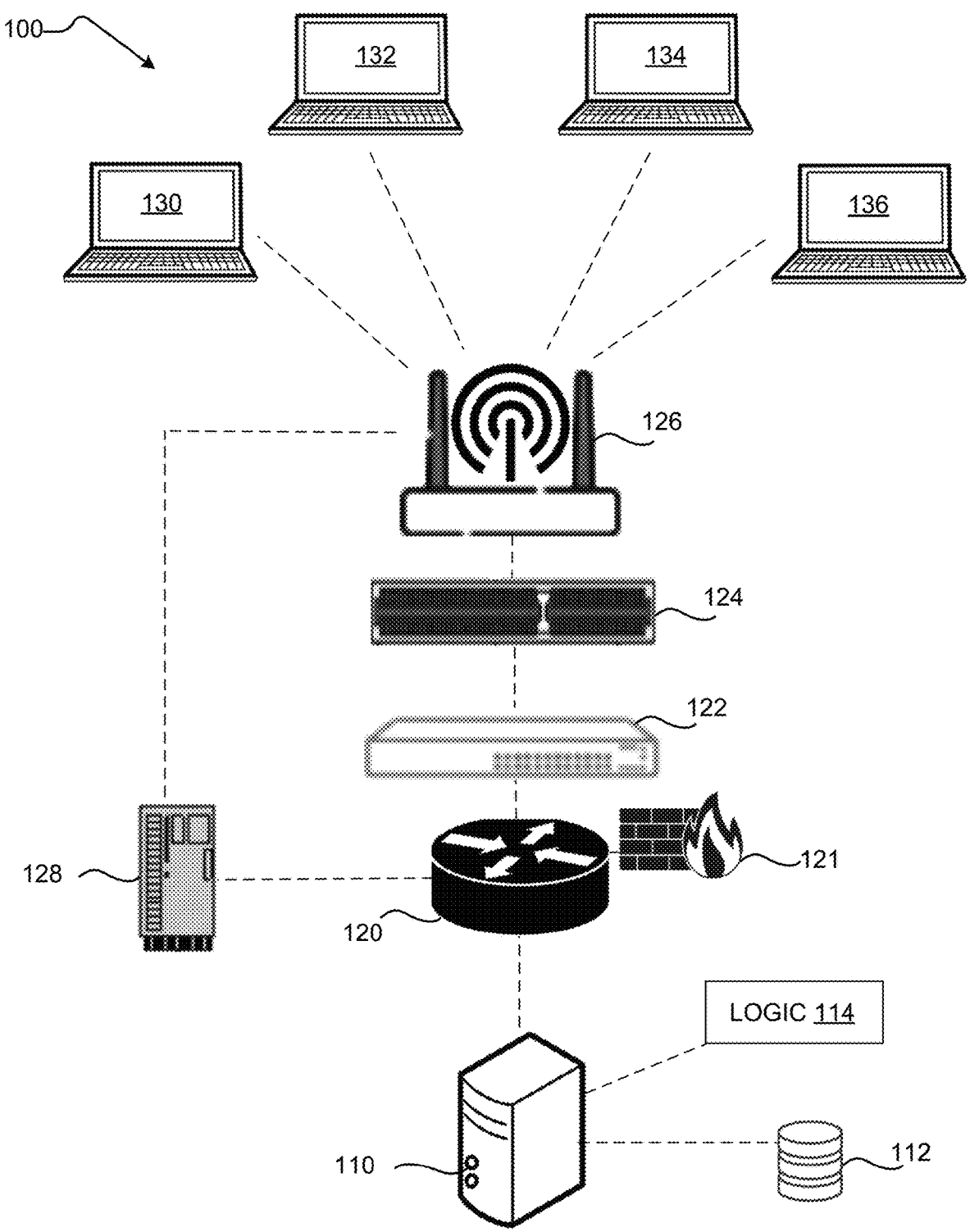
FIG. 1 is an example illustration of a computing system of a network device according to examples described in the present disclosure.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

The following description provides specific details for a comprehensive understanding of, and enabling description for, various embodiments of the technology. It is intended that the terminology used be interpreted in its broadest reasonable manner, even where it is being used in conjunction with a detailed description of certain embodiments.

Before describing the present teachings in detail, it is to be understood that the disclosure is not limited to specific compositions or process steps, and as such, may vary. As used herein, the singular forms "a," "an," and "the" are intended to include the plural forms as well, unless the context clearly indicates otherwise. Furthermore, to the extent that the terms "including," "includes," "having," "has," "with," "such as," or variants thereof, are used in either the specification and/or the claims, such terms are not limiting and are intended to be inclusive in a manner similar to the term "comprising." Unless specifically noted, embodiments in the specification that recite "comprising" various components are also contemplated as "consisting of" or "consisting essentially of" the recited components.

Described herein are solutions that address problems relating to communication connection issues between client devices and network devices in a network, particularly to data traffic congestion issues occurring at network devices.

Currently, there is an existing issue with communication connections between network devices at customer sites, such as an access point (AP). Such communication connection issues may involve the congestion of data traffic between devices in a network, where such data traffic in a specific direction is sub-optimal, or even completely congested and stuck. For example, if a downlink transmission control protocol (TCP) session is established between an AP and a client device, and the transmitter (TX) of the client device is stuck, the TCP acknowledgments (acks) from the client device will not be received by the AP resulting in TCP session timeouts. Any such disparity in data traffic may not only provide a bad user experience to enterprise users waiting to receive or send data in the network, but also lead to connectivity issues and the underprovisioning or waste of network capacity over the network. Such data traffic congestion issues may further result in a complete collapse of the network if no resolution is implemented to resolve the issues.

Typically, issues with network devices at customer sites may be found with the data traffic at an AP, even though the management and control frame exchange at the AP may still be successful. Previous implementations of data traffic disparity incorporated timeout logic where if there is no movement of TX and/or receiver (RX) data traffic at the client device for a threshold amount of time, the AP may deauthenticate the client device as a way to resolve the data traffic congestion issue. However, such timeout logic for the AP to deauthenticate a client device did not apply for cases where there is TX data traffic occurring over an AP (the AP is transmitting data traffic to a client device) but there is a congestion with the RX data traffic at the AP (the AP is unable to receive data traffic from the client device). In addition, there has been no incorporation of logic to check the health of an AP, in order to determine if and when all client devices connected to the AP should be deauthenticated because the health of the AP indicates that the RX of the AP is malfunctioning and unable to receive data traffic from any device.

An algorithm may be generated and used as a method to identify issues with communication connections, such as an uplink data traffic in a downlink TCP session, between client devices and network devices in a network. One issue that may be identified is when the TX of the client device is stuck. In one embodiment, the method may include determining that the network device has failed to receive data packets and/or messages sent from the client device. This may be determined by monitoring if the network device is able to receive responses from the client device after transmitting messages, such as trigger buffer status reports (BSRs), to the client device. In another embodiment, the method may include determining if a neighboring network device is able to monitor if messages and/or data packets are being sent from the client device to the main network device. If the neighboring network device is able to determine from monitoring that messages and/or data packets from the client device are being send to the main network device but the main network device continues to be unable to receive any messages and/or data packets from the client, then it may be concluded that there is an issue with the uplink connection between the client device and the main network device.

An algorithm may also be generated and used as a method to provide solutions to resolve any identified issues with communication connections. When an issue with a communication connection is identified, a total number of issues with the communication connection may be determined. For example, there may be multiple issues with uplink data traffic between a client device and a network device. Determining that the total number of issues with a communication connection is greater than a threshold, the client device associated with the communication connection may be deauthenticated from the respective network device. In one embodiment, one solution to fixing a connection issue between a client device and a network device may include deauthenticating the client device from one radio of the network device and reconnecting the client device to a different radio of the same network device. In another embodiment, a second solution may include deauthenticating the client device from the network device and establishing a new connection between the client device and a different network device in the network. If more than a threshold of client devices are deauthenticated from a particular network device due to the network device's inability to receive data traffic, then all of the client devices connected to the network device may be deauthenticated from the network device and reconnected to one or more different network devices. A report of this issue regarding the particular network device's inability to receive data traffic may be generated and sent to an administrative system to be analyzed. Solutions may be implemented according to the issues identified.

FIG. 1 is an example illustration of computing system 100 including one or more computing components that may encompass any of a server 110, a router 120, a switch 122, a network controller 124, an access point 126, and a DHCP server 128. In some examples, the router 120 may be associated with a firewall 121. The server 110 may further include or be associated with a database or cache 112 (hereinafter "database") which stores attributes of particular client devices and access control lists or policies associated with particular client devices, such as client devices 130-136, which connect to a network via the access point 126. In some examples, any or all of the client devices 130-136 may include plug and play devices. Although only four client devices are illustrated in FIG. 1, any number of client devices may be connected via the access point 126.

The database 112 may be integrated or embedded within the server 110 or spatially separated from the server 110. The access control lists may be stored as files and/or may be indexed. In some examples, the access control lists or policies may include particular access levels and/or access privileges to be assigned to each client device depending on a group or classification that the client device belongs to. For example, the access privileges may indicate a subset (e.g., a portion or all) of data resources, such as particular data servers, databases, platforms, objects, file directories, or files that each client device is authorized to access, particular protocols (e.g., Hypertext Transfer Protocol (HTTP) or File Transfer Protocol (FTP)) that each client device may utilize to access data resources, a transmission speed or rate to be provided to each of the client devices, one or more Vendor Specific Attributes (VSA), and/or a particular VLAN to be assigned to each client device. In some examples, the VSA may include bandwidth on incoming and/or outgoing traffic, and download and/or upload speeds. The access control lists or policies may be stored in the database 112 of the server 110, rather than at other computing components such as the router 120, so that the server 110 may centrally update the access control lists or policies and propagate any updates to other computing components in the network.

Each of the computing components may include one or more hardware processors and logic that implements instructions to carry out the functions of the computing components. The server 110 may include or be associated with one or more hardware processors and logic 114 that implements instructions or protocols to carry out the functions of the server 110. The logic 114 may execute instructions to perform one or more steps in determining when the uplink data traffic between a client device and a network device is stuck, and in deauthenticating the connection between a client device and a network device to resolve an uplink data traffic issue.

Figure 2:
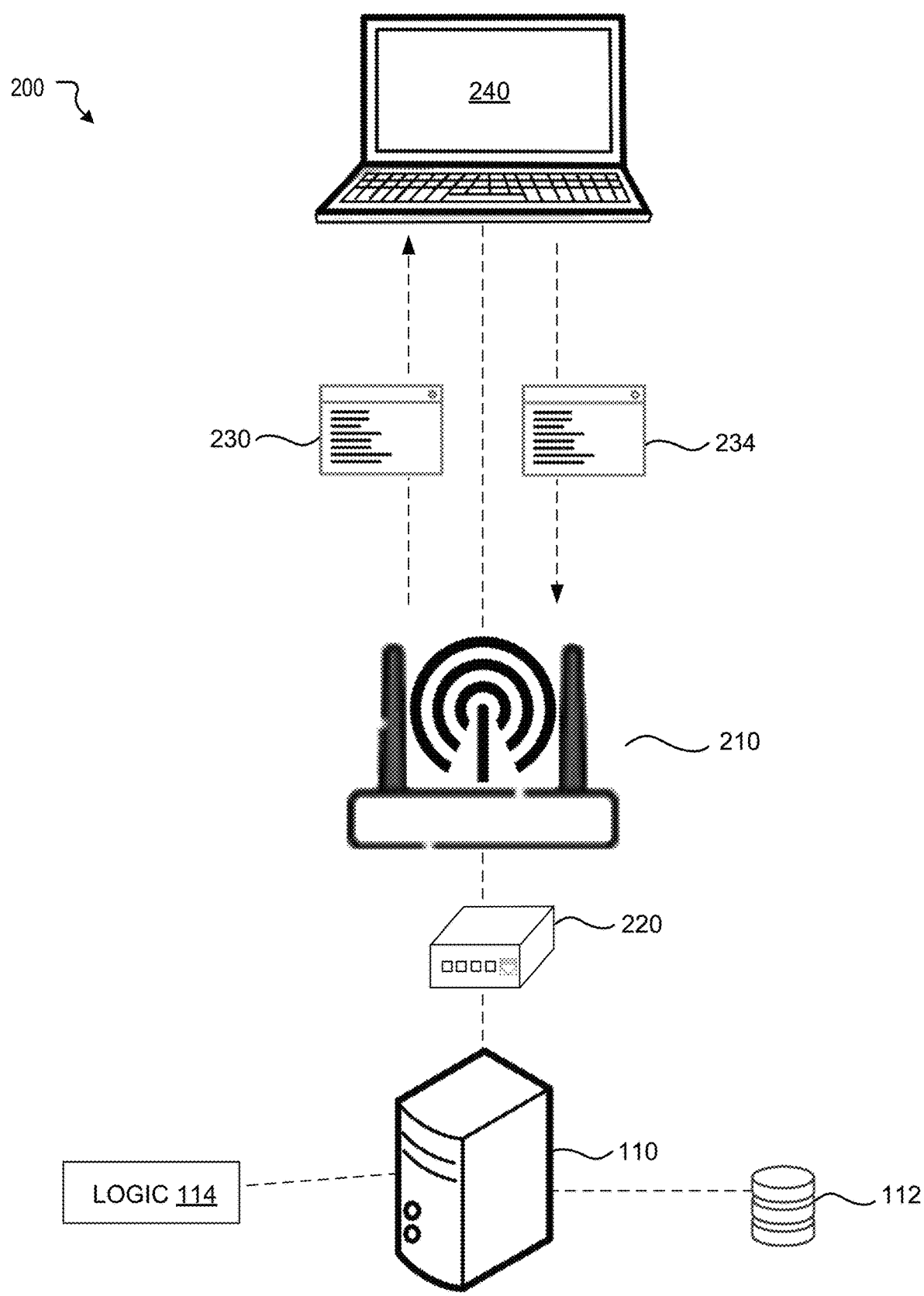
FIG. 2 is an example illustration of analyzing an uplink data traffic between a network device and a client device in accordance with various embodiments of the present disclosure.

FIG. 2 is an illustration of an example network 200 of a communication connection, such as an uplink data traffic in a downlink TCP session, between a network device and a client device in accordance with various examples of the present disclosure. In some examples, the network 200 can comprise or include one or more computing components that may encompass any of the server 110, an access point 210, a device 220 and a client device 240. FIG. 2 elaborates on specific components of FIG. 1 while elucidating an exchange of information among the components. The network may include a plurality of network devices, including access point 210 and device 220. The client device 240 can be any of computing devices, such as computers, mobile phones, tablet devices, etc. The client device 240 may be implemented as any of the client devices 130, 132, 134, or 136 of FIG. 1. The access point 210 may be implemented as the access point 126 of FIG. 1. The device 220 may be implemented as an access point, or the router 120, switch 122, or network controller 124 of FIG. 1. The device 220 can be configured to connect various computing components in a network, such as the client device 240, a router, a switch, a network controller, access point 210, and the server 110. The device 220 may be configured to connect the client device 240 to any of the plurality of network devices in the network. The server 110 may further include or be associated with the database 112 which stores attributes of particular client devices, servers, and access control lists or policies associated with the client device 240, which connect to a network via an access point, such as access point 210.

In some examples, the client device 240 can access the internet, wirelessly, through Wi-Fi (e.g., IEEE 802.11), Bluetooth (e.g., IEEE 802.15.1), or cellular connection (e.g., long-term evolution, $5^{th}$ generation cellular networks, etc.) to wirelessly access the server 110 through the network device 220 and/or the access point 210. The server 110 can implement software and/or hardware, such as web servers, application server, communications server, database server, etc. The server 110 can access the internet through Wi-Fi, Bluetooth, phone line, or LAN/WLAN network interface. In other examples, the network device 220 can be an enterprise intranet (e.g., a private network) and the client device 240 can access the enterprise intranet, wirelessly, through the network device 220 to access data files or other enterprise data. In some cases, the network device 220 can be a network link (e.g., Wi-Fi, Ethernet port, router, switch, etc.) that allows a plurality of computing components to communicate with each other. In this example, the network device 220 can establish a client-network communication between the client device 240 and the access point 210.

In some examples, a communication connection may be established between the client device 240 and the access point 210. The communication connection may be an uplink data traffic in a downlink TCP session. The access point 210 may include a plurality of radios. The client device 240 may connect to the access point 210 using one of the plurality of radios. The access point 210 may be one of a plurality of network devices in the network, including other access points. The network may allow each network device in the network to communicate to one another. The client device 240 may connect to any of the plurality of network devices in the network. The client device 240 may be one of a plurality of client devices that can connect to the access point 210 in the network.

A network device, such as access point 210, may include a total set amount of available resources, with the total set amount of available resources being dependent on the respective access point. A client device that connects to a network device may require a set amount of resources to use, with the set amount of required resources being dependent on the respective client device. A portion of the total set amount of available resources of a network device may be used when a client device is connected to the network device. The network device may allow as many client devices to connect to it as it is able to according to its total set amount of available resources, where the total amount of required resources of all of the connect client devices does not exceed the total set amount of available resources. A network device may not connect to a client device if doing so will cause the total amount of required resources to exceed its total set amount of available resources.

Given that a network device has a finite total set amount of available resources, it is important to utilize as much of the available resources of a network device as possible. With each client device having its own amount of required resources to use from a network device, a network may determine which network device to connect to the client device based on the amount of available resources in each of the plurality of network devices in the network, and the amount of required resources of the client device. If there is an issue with a communication connection between a network device and a client device, the network device or the network, such as network 200, may take steps to resolve the issue. An issue may be that a client device, such as client device 240, is unable to, or has failed to, send messages and/or data packets to a network device, such as access point 210. An issue with a communication connection between a client device and a network device may be caused by a variety of reasons, including issues with the RX or TX of the network device, issues with the RX or TX of the client device, malfunctions with the network device, and/or malfunctions with the client device. Steps to resolve an issue may include deauthenticating, or disconnecting, the client device from the network device. The client device may then be reconnected to the network device to establish a new communication connection, connected to another network device in the network, or removed from the network, and/or the network device may undergo repairs, according to the type of issue(s) found with the disconnected communication connection.

Resolving issues with communication connections between a network device and a client device may ensure that each network device in a network is utilizing as much of its available resources as possible and that no resources are going to waste by not being used because of a communication connection problem. Also, given that there can be a limited number of network devices and a larger number of client devices in a network, disconnecting client devices with communication connection problems may allow for other client devices to be connected. Further, discovering and resolving any communication connection issues in a quick and efficient manner may allow for client devices to have optimal communication connections in a network where there are little to no connectivity issues being experienced by the client. This way, clients using their client devices may be able to send and receive message and data packets in the network without experiencing any issues.

When a communication connection is established between the client device 240 and the access point 210, the access point 210 may transmit messages 230 to and receive messages 234 from the client device 240. Messages may include data packets (e.g., unicast and multicast), reports (e.g., Buffer Status Report (BSR), Quality of Service (QOS) NULL data frames, Transmission Control Protocol (TCP) acknowledgements, etc.).

There may be times when the access point 210 may not receive any messages and/or data packets from the client device 240. When the access point 210 has not received any messages and/or data packets from the client device 240, the access point 210 may determine if there is an issue with its communication connection with the client device 240. It is important for a network device, such as access point 210, to have an up-to-date status of its communication connections with each of the client devices that it is connected to, including client device 240. Given that a network device has a finite total set amount of available resources, it is important for the network device to ensure that all of its resources are being used efficiently. If there is an issue with the communication connection between a network device and a client device, then the resources used by the client device may be wasted since the client device is unable to send and/or receive messages and data packets to/from the network device.

To determine if there is an issue with the communication connection between the access point 210 and the client device 240, the access point 210 may send a message, such as message 230, to the client device 240. The message 230 may include a query of whether the client device 240 is sending a data packet to the access point 210, i.e., a query message. The query message may also include a request for a response from the client device 240. The requested response message may indicate whether the client device 240 is sending a data packet to the access point 210. The access point 210 may send a query message to the client device 240 periodically. The period of time between query messages being sent from the access point 210 to the client device 240 may be preset or may vary according to a plurality of factors, including the type of client device, type of network device, the type of network, the number of the plurality of client devices in the network, the amount of available resources in the network device, etc. If the access point 210 may only send a query message to the client device 240 if the access point 210 has not received a message and/or data packet from the client device 240 in a duration of time, such as the period of time between query messages.

After the access point 210 sends a query message to the client device 240, the access point 210 may determine if it receives a response message, such as message 234, from the client device 240. In one embodiment, the access point 210 may determine that it did receive a response message from the client device 240. In another embodiment, the access point 210 may determine that it did not receive a response message from the client device 240. Determining whether a response message is received from the client device 240, in combination with whether any data packets are received from the client device 240, may allow the access point 210 to determine if there is an issue with the communication connection between the access point 210 and the client device 240. If there is an issue with the communication connection between the access point 210 and the client device 240, then the access point 210 may be unable to receive any messages and/or data packets that the client device 240 is trying to send to the access point 210.

If the access point 210 determines that it did receive a response message from the client device 240, the access point 210 may further determine the content of the response message. In one embodiment, the response message may indicate that the client device 240 is not sending a data packet to the access point 210. In another embodiment, the response message may indicate that the client device 240 is sending a data packet to the access point 210.

If the response message indicates that the client device 240 is not sending a data packet to the access point 210, the access point 210 may determine that there is no issue with the communication connection between the access point 210 and the client device 240. The access point 210 may generate a status report for the communication connection with the client device 240, where the status report may indicate that the communication connection between the access point 210 and client device 240 is in good standing. A status report may accurately show the status of the communication connection between the access point 210 and the respective client device. A status report of a communication connection may also show if there have been any issues with sending messages to or receiving messages from the respective client device, including how many issues have occurred, when they have occurred, the type of issue at each occurrence, etc.

If the response message indicates that the client device 240 is sending a data packet to the access point 210, the access point 210 may further determine whether it has received a data packet from the client device 240. In one embodiment, the access point 210 may determine that a data packet from the client device 240 has been received, after receiving the response message indicating that the client device 240 is sending a data packet to the access point 210. In another embodiment, the access point 210 may determine that a data packet from the client device 240 has not been received, after receiving the response message indicating that the client device 240 is sending a data packet to the access point 210.

If the access point 210 determines that a data packet from the client device 240 has been received, the access point 210 may determine that the communication connection with the client device 240 is in good standing. The access point 210 may generate a status report to include that the communication connection with the client device 240 is in good standing and provide details of this analysis. If the access point 210 determines that a data packet has not been received from the client device 240, the access point 210 may then determine that there is an issue with the communication connection with the client device 240. If the access point 210 does not receive a response message from the client device 240, the access point 210 may determine that there is an issue with the communication connection with the client device 240.

Determining there is an issue with a communication connection between the access point 210 and the client device 240, a network, such as network 200, may take steps to resolve the issue. If the network 200 is unable to resolve a communication connection issue between access point 210 and client device 240, the network 200 may disconnect the client device 240 from the access point 210. The network 200 may then reconnect the client device 240 to the access point 210, connect the client device 240 to another access point in the network, remove the client device 240 from the network, and/or repair access point 210.

In one embodiment, when the access point 210 determines there is an issue with the communication connection with the client device 240, the access point 210 may generate a status report for the communication connection with the client device 240, indicating that there is an issue with the communication connection with client device 240. The status report may indicate that there is an issue with the communication connection with client device 240. The status report may also indicate the time the issue was determined, the type of issue, the total number of issues that have been determined, details for each of the previously determined issues, and the number of issues that have occurred since the last message or data packet has been received by the access point 210 from the client device 240, i.e., count of issues. For example, if 10 issues have previously occurred with the communication connection between the access point 210 and the client device 240 since the last message or data packet has been received by the access point 210 from the client device 240, then the status report may increase the count of issues to 11 when a new issue is determined. Once a message and/or data packet is received by the access point 210 from the client device 240, then the count of issues may be reset to zero. The count of issues may indicate the number of issues that have occurred in succession since the last message or data packet was received by a network device from a particular client device. If too many issues occur in succession with a communication connection between a client device and a network device, then there could be a serious problem with the communication connection and steps to resolve the problem(s) may need to be performed.

In another embodiment, when the access point 210 determines there is an issue with the communication connection with the client device 240, the access point 210 may perform steps to confirm if the issue is valid and what is causing the issue, before a status report is generated. Steps to confirm if the issue is valid and the cause of the issue may be described in detail in FIG. 3.

Figure 3:
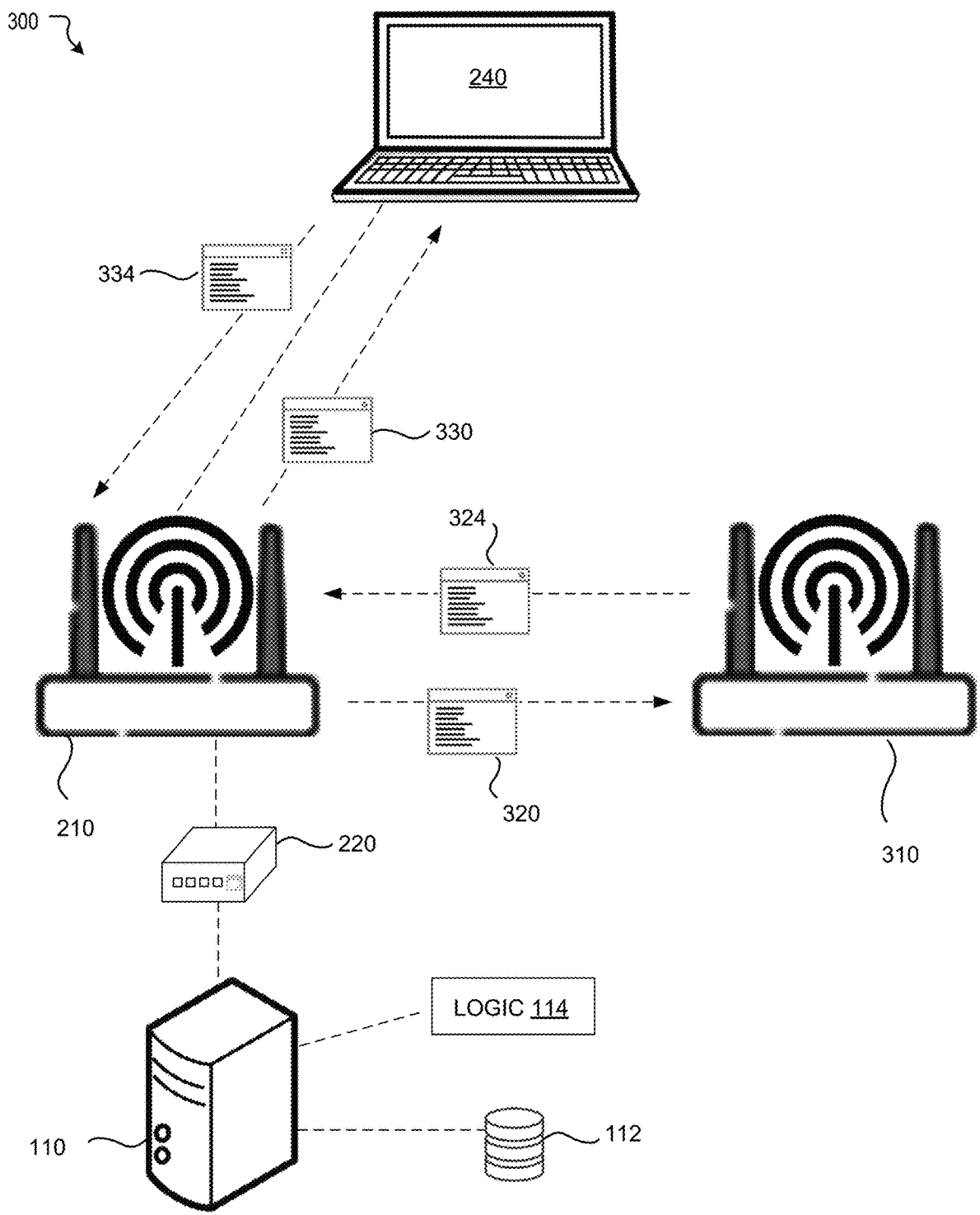
FIG. 3 is an example illustration of analyzing an uplink data traffic between a client device and multiple network devices in accordance with various embodiments of the present disclosure.

FIG. 3 is an illustration of an example network 300 of a communication connection between a network device and a client device in accordance with various examples of the present disclosure. In some examples, the network 200 can comprise or include one or more computing components that may encompass any of the server 110, an access point 210, a device 220 and a client device 240. FIG. 3 elaborates on specific components of FIG. 1 and FIG. 2 while elucidating an exchange of information among the components. The network may include a plurality of network devices, including access point 210, access point 310, and device 220. The client device 240 can be any of computing devices, such as computers, mobile phones, tablet devices, etc. The client device 240 may be implemented as any of the client devices 130, 132, 134, or 136 of FIG. 1, or the client device 240 of FIG. 2. The access point 210 may be implemented as the access point 126 of FIG. 1, or the access point 210 of FIG. 2. The device 220 may be implemented as an access point, or the router 120, switch 122, or network controller 124 of FIG. 1, or the device 220 of FIG. 2. The device 220 can be configured to connect various computing components in a network, such as the client device 240, a router, a switch, a network controller, access point 210, access point 310, and the server 110. The device 220 may be configured to connect the client device 240 to any of the plurality of network devices in the network, including access point 210 and access point 310. The server 110 may further include or be associated with the database 112 which stores attributes of particular client devices, servers, and access control lists or policies associated with the client device 240, which connect to a network via an access point, such as access point 210 and access point 310.

In some examples, the client device 240 can access the internet, wirelessly, through Wi-Fi (e.g., IEEE 802.11), Bluetooth (e.g., IEEE 802.15.1), or cellular connection (e.g., long-term evolution, 5th generation cellular networks, etc.) to wirelessly access the server 110 through the network device 220 and/or the access point 210. The server 110 can implement software and/or hardware, such as web servers, application server, communications server, database server, etc. The server 110 can access the internet through Wi-Fi, Bluetooth, phone line, or LAN/WLAN network interface. In other examples, the network device 220 can be an enterprise intranet (e.g., a private network) and the client device 240 can access the enterprise intranet, wirelessly, through the network device 220 to access data files or other enterprise data. In some cases, the network device 220 can be a network link (e.g., Wi-Fi, Ethernet port, router, switch, etc.) that allows a plurality of computing components to communicate with each other. In this example, the network device 220 can establish a client-network communication between the client device 240 and the access point 210.

In some examples, the client device 240 may establish a communication connection with the access point 210. The communication connection may an uplink data traffic in a downlink TCP session. The access points 210 and 310 may each include a plurality of radios. The client device 240 may connect to the access point 210 using one of the plurality of radios of access point 210. The access points 210 and 310 may be two of a plurality of network devices in the network, including other access points. The network may allow each network device in the network to communicate to one another. Each network device in the network may monitor messages and/or data packets being sent between client devices and other network devices in the network. The client device 240 may connect to any one of the plurality of network devices in the network. The client device 240 may be one of a plurality of client devices that can connect to any one of the plurality of network devices in a network, including access points 210 and 310 in the network 300.

A network device, such as access point 210 or access point 310, may include a total set amount of available resources, with the total set amount of available resources being dependent on the respective access point. A client device that connects to a network device may require a set amount of resources to use, with the set amount of required resources being dependent on the respective client device. A portion of the total set amount of available resources of a network device may be used when a client device is connected to the network device. The network device may allow as many client devices to connect to it as it is able to according to its total set amount of available resources, where the total amount of required resources of all of the connect client devices does not exceed the total set amount of available resources. A network device may not permit a client device to establish a communication connection with it if doing so will cause the total amount of required resources to exceed its total set amount of available resources.

When a communication connection is established between the client device 240 and the access point 210, the access point 210 may transmit messages 330 to and receive messages 334 from the client device 240. Access point 210 and access point 310 may establish a communication connection between each other where access point 210 may transmit messages 320 to and receive messages 324 from the access point 310. Messages may include data packets (e.g., unicast and multicast), reports (e.g., Buffer Status Report (BSR), Quality of Service (QOS) NULL data frames, Transmission Control Protocol (TCP) acknowledgements, etc.). A network device may monitor messages being sent to other network devices in the network. For example, access point 310 may monitor messages 330 and messages 334 between the client device 240 and the access point 210 in the network 300. Monitoring messages of other network devices in a network may include reading the messages to determine the contents of each message.

When the access point 210 determines that there is an issue with the communication connection between the access point 210 and the client device 240, the access point 210 may perform steps to resolve the issue before generating a status report. The access point 210 may have communication connections with other access points in the network, including access point 310. The access point 210 may send a message 320 to the access point 310. The message 320 may include a request for the access point 310 to monitor messages being sent between assess point 210 and client device 240, such as messages 330 and 334. After the access point 310 receives message 320 of the request to monitor, the access point 310 may monitor messages 330 and 334 being sent between the access point 210 and client device 240. As access point 310 is monitoring messages 330 and 334, the access point 310 may read the messages to determine the contents of each message. Access point 310 may then determine if client device 240 is sending a message and/or data packet to the access point 210.

After the access point 210 has sent the message 320, including a request to monitor the messages being sent between access point 210 and client device 240, to the access point 310, the access point 210 may send the message 330, including the query message, to the client device 240. Upon receiving the message 320, including the request message, from the access point 210, the access point 310 may monitor the communication connection between the access point 210 and client device 240 to determine if any messages 334 are sent from the client device 240 to the access point 210. If there is an issue with receiving messages 334 from client device 240, then access point 210 may be unable to receive any data packets that the client device 240 is trying to send to the access point 210. In one embodiment, the access point 210 may determine that it did receive a response message of message 334 from the client device 240. In another embodiment, the access point 210 may determine that it did not receive a response message of message 334 from the client device 240.

The access point 210 may send a query message to the client device 240 periodically. The period of time between query messages being sent from the access point 210 to the client device 240 may be preset or may vary according to a plurality of factors, including the type of client device, type of network device, the type of network, the number of the plurality of client devices in the network, the amount of available resources in the network device, etc. If the access point 210 may only send a query message to the client device 240 if the access point 210 has not received a message and/or data packet from the client device 240 in duration of time, such as the period of time between query messages.

After the access point 210 determines that it did not receive a response message of message 334 from the client device 240, the access point 210 may send a follow-up message to access point 310 as message 320. The follow-up message may be a request of whether the access point 310 monitored a message 334 being sent from the client device 240 to the access point 210. Upon receiving the follow-up message of message 320 from the access point 210, the access point 310 may send a message 324 to the access point 210, responding to the follow-up message. The response to the follow-up message from the access point 310 may indicate whether the access point 310 monitored a response message of message 344 from the client device 240. The response to the follow-up message from the access point 310 may also indicate the contents of the response message of message 334 from the client device 240. The contents may include a response to the query message sent from the access point 210 to the client device 240. In one embodiment, the contents may include an indication that the client device 240 is not sending any data packets to the access point 210. In another embodiment, the contents may include an indication that the client device 240 is sending a data packet to the access point 210.

In one embodiment, the access point 210 may determine that it did receive a response message of message 334 from the client device 240. The access point 210 may further determine the contents of the response message of 334. If the response message of message 334 indicates that the client device 240 is sending a data packet to the access point 210, the access point 210 may determine if it has received a data packet from the client device 240. If a data packet is received by the access point 210 from the client device 240, a status report may be generated indicating the communication connection with the client device 240 is in good standing. If no data packet is received by the access point 210 from the client device 240, it may be determined and/or confirmed that there is an issue with the communication connection with the client device 240. If the response message of message 334 indicates that the client device 240 is not sending a data packet to the access point 210, the access point 210 may determine that there is no issue with the communication connection with the client device 240 and a status report may be generated indicating the communication connection with the client device 240 is in good standing.

In another embodiment, the access point 210 may determine that it did not receive a response message of message 334 from the client device 240. The access point 210 may also determine, from message 324 sent from the access point 310, that the client device 240 did send a message of message 334 to the access point 210. The access point 210 may then determine that there is an issue with the communication connection with client device 240 caused by the access point 210.

In another embodiment, the access point 210 may determine that it did not receive a response message of message 334 from the client device 240. The access point 210 may also determine, from message 324 sent from the access point 310, that the client device did not send a message of message 334 to the access point 210. The access point 210 may then determine and/or confirm that there is an issue with the communication connection with the client device 240. The access point 210 may also determine that any communication connection issues with the client device 240 are caused by the client device 240 since the access point 210 did not receive nor the access point 310 monitored a response message from the client device 240. The access point 210 may then deauthenticate the client device 240. Deauthenticating the client device 240 from the access point 210 may include disconnecting the client device 240 from a radio of the access point 210. Deauthenticating the client device 210 may allow a new communication connection to be established between the client device 210 and one of the plurality of network devices in the network, including access points 210 and 310. Establishing a new communication connection may resolve any issues of the client device 240 that prevented the client device 240 from sending messages and/or data packets to the client device 210.

Upon a determination and/or confirmation that there is a communication connection issue, a status report may be generated for the communication connection with the client device 240. The status report may indicate that there is an issue with the communication connection with client device 240. The status report may also indicate the time the issue was determined, the type of issue, the total number of issues that have been previously determined, details for each of the previously determined issues, the number of issues that have occurred since the last message or data packet was received from the client device 240, i.e., count of issues, and other related information regarding the communication connection between the access point 210 and the client device 240. For example, if 10 issues have occurred with the communication connection between the access point 210 and the client device 240 since the last message or data packet was received from the client device 240, then the status report may increase the count of issues to 11 when a new issue is determined. Once a message and/or data packet is received by the access point 210 from the client device 240, then the count of issues may be reset to zero. The count of issues may indicate the number of issues that have occurred in succession since the last message or data packet was received by a network device from a particular client device. If too many issues with a communication connection between a client device and a network device occur in succession or if too many issues with a communication connection have occurred in total, then there could be a serious problem with the communication connection and steps to resolve the problem(s) may need to be performed.

When the number of issues that have occurred is greater than a threshold (i.e., issue threshold), it may be determined that the communication connection between a client device, such as client device 240, and a network device, such as access point 210, needs to be fixed and any issues need to be resolved. In one embodiment, the issue threshold may be used as a maximum number of issues that are allowed to occur with a communication connection between a client device and a network device. In another embodiment, the issue threshold may be used as a maximum number of total issues that are allowed to occur with a communication connection between a client device and a network device. The issue threshold may represent the maximum number of communication connection issues and/or failed attempts with obtaining messages and/or data packets from a client device that are allowed to occur with at a given network device, such as client device 210. The issue threshold may be preset or may vary according to a plurality of factors, including the type of the client device, type of network device, the type of network, the number of the plurality of client devices in the network, the amount of available resources in the network device, etc. One or more solutions may be implemented to resolve issues with a communication connection between a client device and a network device.

Otherwise, when the number of issues that have occurred is not greater than the issue threshold, it may be determined that a client device, such as client device 240, may maintain being connected to a network device, such as access point 210, and that the communication connection between the client device and the network device does not need to be fixed immediately. The client device and the network device may continue to send and receive messages between each other. As an example, the access point 210 may proceed with sending more messages 330 to the client device 240 querying if the client device 240 is sending data packets to the access point 210. The client device 240 may proceed with trying to send data packets via message 334 to the access point 210. Allowing the client device to maintain the communication connection with the network device may allow the client device and/or network device to correct any issues it may be having with sending and/or receiving messages and data packets to each other before deauthenticating the client device from the network device.

To resolve an issue with a communication connection between a client device, such as client device 240, and a network device, such as access point 210, the client device may be deauthenticated from the network device. Deauthenticating a client device from a network device may include disconnecting the client device from the network device. In one embodiment, the client device 240 may be deauthenticated from the access point 210 by disconnecting the client device 240 from the access point 210. Deauthenticating the client device 240 from the access point 210 will disengage or remove the communication connection between the client device 240 and the access point 210. Deauthenticating the client device 240 from the network device in the network that it is connected to may be performed when it is determined that the communication connection issue(s) with the client device 240 are caused by the client device 240. Deauthenticating the client device 240 from the network device may allow the client device 240 to troubleshoot and resolve its communication connection issues without occupying and wasting resources of network devices, which would free up those resources, that the client device 240 was using, for other client devices to connect to. Thus, the network device may fully utilize its limited resources to allow as many client devices to connect to and use the network as possible.

After a client device, such as client device 240, is deauthenticated from a network device, such as access point 210, one or more steps may be performed to resolve any communication connection issues with the client device.

In one embodiment, a solution may be to reconnect the client device 240 to the access point 210 via a radio other than the one previously used to connect to the access point 210. A network device, such as access point 210, may include a plurality of radios where each radio may be used to connect to one or more client devices. Each radio may use a portion of the total amount of resources in a network device to connect to one or more client devices. Reconnecting the client device 240 to the access point 210 via another radio of the access point 210 may establish a new communication connection between the client device 240 and the access point 210. The new communication connection may resolve any issues that occurred with the previous communication connection and also may perform better than the previous communication connection, allowing for faster and more efficient transmittance of messages between the client device, such as client device 240, and the network device, such as access point 210.

In another embodiment, a solution may be to connect the client device, such as client device 240, to another network device in the network, such as access point 310. Access point 310 may be a neighboring network device to access point 210 in the network 300. Access point 310 may be a network device in the network 300 that the client device 240 may also connect to from access point 210. Connecting the client device 240 to the access point 310 may establish a new communication connection between the client device 240 and the access point 310. The access point 310 may send messages to, such as message 340, and receive messages from, such as messages 344, the client device 240.

After the client device 240 is deauthenticated from the access point 210, a status report may be generated for the access point 210. The status report may indicate the total number of client devices that have been deauthenticated from the access point 210, the number of client devices that have been deauthenticated within a duration of time, i.e., deauthentication duration, the number of client devices currently connected to the access point 210, the number of available resources of access point 210 for client devices to connect to, etc. The status report may also indicate the time of occurrence and other information associated with each of the deauthentications that occurred with the access point 210. For example, if 10 deauthentications have previously occurred with the access point 210, then after client device 240 has been deauthenticated from access point 210, a status report may be generated showing that a total of 11 deauthentications have now occurred with access point 210. The deauthentication duration may be preset or may vary according to a plurality of factors, including the type of network device, the type of network, the number of the plurality of client devices in the network, the amount of available resources in the network device, etc. The deauthentication duration may be a time used by a network device (i.e., access point 210) to evaluate the degree of the condition of a network device (i.e., access point 210). If too many client devices are deauthenticated from a network device within the deauthentication duration or if too many deauthentications have occurred in total with a network device, then there could be a serious problem with the network device and steps to resolve the problem(s) may need to be performed.

When the number of deauthentications that have occurred is greater than a threshold (i.e., deauthentication threshold), it may be determined that the network device, such as access point 210, has an issue with its communication capabilities and the network device needs to be fixed to resolve the issue(s). In one embodiment, the deauthentication threshold may be used as a maximum number of deauthentications that are allowed to occur with a network device within a particular duration of time, i.e., the deauthentication duration. In another embodiment, the deauthentication threshold may be used as a maximum number of total deauthentications that are allowed to occur with a network device. The deauthentication threshold may be preset or may vary according to a plurality of factors, including the type of the network device, the type of network, the number of the plurality of client devices in the network, the amount of available resources in the network device, etc.

Upon determining that a network device, such as access point 210, has an issue with its communication capabilities because the network device has deauthenticated a number of client devices greater than the deauthentication threshold, the network device may deauthenticate all of the plurality of client devices that are still connected to the network device. In one embodiment, it may be determined that the total number of deauthentications with the access point 210 is greater than the deauthentication threshold after the client device 240 has been deauthenticated from the access point 210. All of the client devices that are still connected to the access point 210 may be deauthenticated from the access point 210.

In one embodiment, deauthenticating all of the client devices still connected to the access point 210 may include disconnecting the client devices from the access point 210 to disengage all of the remaining communication connections with the access point 210. In another embodiment, deauthenticating all of the client devices still connected to the access point 210 may include disabling the radio of the access point 210 that was used to connect to the client device 240. In another embodiment, deauthenticating all of the client devices still connected to the access point 210 may include disabling all of the radios of the access point 210. All of the client devices that were deauthenticated may be connected to another network device in the network 300, such as access point 310. Access point 310 may be a neighboring network device from access point 210 and all of the client devices may be able to connect to the access point 310.

After the remaining client devices of a network device, such as access point 210, are deauthenticated and connected to a neighboring network device, such as access point 310, a status report may be generated. The status report may indicate that there is a communication issue, or other types of issues, with a network device and its ability to send and/or receive messages and data packets from client devices. The status report may indicate that the network device is malfunctioning and needs to be fixed. The status report may also provide a summary of the issues that have occurred with the network device, including information related to issues that have occurred with each of the client devices that it has deauthenticated. The status report may also provide feedback as to what may be causing the issues with the network device. The status report may also provide feedback as to possible solutions to solving the issues with the network device. After a status report is generated, the status report may be sent to a network administrator. The network administrator may use the status report to address and fix any issues with the network device. The network administrator may also use the report to prevent issues occurring with other network devices.

Otherwise, when the number of deauthentications that have occurred is not greater than the deauthentication threshold, it may be determined that a network device, such as access point 210, may maintain its communication connections with its remaining connected client devices. Allowing the network device to maintain the communication connections with the remaining client devices may allow the network device to correct any issues it may be having with sending and/or receiving messages and data packets with the remaining client devices.

Actively monitoring the communication connections between network devices and client devices may allow networks to provide better efficiency and performance of communications in each respective network. Any issues with the communication connections between client devices and network devices may be resolved more quickly and effectively to decrease lag time in communication and increase user experience. Further, the types of issues may be more efficiently determined, such as whether issues with communication connections is caused by a client device or a network device, and the appropriate solutions may be provided to more quickly and efficiently resolve any issues.

FIG. 4 illustrates a computing component 400 that includes one or more hardware processors 402 and machine-readable storage media 404 storing a set of machine-readable/machine-executable instructions that, when executed, cause the hardware processor(s) 402 to perform an illustrative method of determining and resolving issues with communication connections between a network device and a client device. It should be appreciated that there can be additional, fewer, or alternative steps performed in similar or alternative orders, or in parallel, within the scope of the various examples discussed herein unless otherwise stated. The computing component 400 may be implemented as the server 110 of FIG. 1, FIG. 2, and FIG. 3. FIG. 4 summarizes and further elaborates on some aspects previously described.

At instruction 408, the hardware processor(s) 402 may execute machine-readable/machine-executable instructions stored in the machine-readable storage media 404 to send a query message to a first client device (e.g., any of the client devices illustrated in FIG. 1, FIG. 2, or FIG. 3). A first network device may have a communication connection with the first client device. The first network device may be an access point, router, switch, gateway, etc. The communication connection may be a downlink TCP session. The first client device may be one of a plurality of client devices that have a communication connection with the first network device. The first network device may be able to receive messages from and send messages to the first client device. Messages may include data packets (e.g., unicast and multicast) and reports (e.g., Buffer Status Report (BSR), Quality of Service (QOS) NULL data frames, Transmission Control Protocol (TCP) acknowledgements, etc.). The first network device may send a message to the first client device querying if the first client device is sending at least one data packet to the first network device. The message to the first client device may also include a request for a response from the first client device indicating whether the first client device is sending at least one data packet to the first network device.

At instruction 410, the hardware processor(s) 402 may execute machine-readable/machine-executable instructions stored in the machine-readable storage media 404 to determine a first response message is received from the first client device. After the first network device sends a message to the first client device querying if the first client device is sending at least one data packet to the first network device, the first network device may determine if it receives a first response message from the first client device. If the first network device determines that it received a first response message from the first client device, the first network device may further determine the contents of the first response message. In one embodiment, the first response message may indicate that the first client device is sending at least one data packet to the first network device. In another embodiment, the first response message may indicate that the first client device is not sending at least one data packet to the first network device.

If the first network device determines that it did not receive a first response message from the first client device, the first network device may send a message to a neighboring network device, i.e., a second network device. The second network device may be an access point, router, switch, gateway, etc. The second network device may be in the same network as the first network device. The second network device may be able to establish a communication connection with the first client device. The message from the first network device to the second network device may be a request for the second network device to monitor the first client device. Monitoring the first client device may include determining if a response message is being sent from the first client device to the first network device and the contents of the response message. The second network device may be able to determine the contents of the response message by being able to read messages being sent between the first client device and the first network device. The first network device may resend the query message to the first client device as the second network device is monitoring the first client device for any messages being sent from the first client device to the first network device.

After the first network device resends the query message to the first client device, the first network device may determine if it receives a second response message from the first client device. The first network device may also determine if the second network device monitored the second response message from the first client device. The first network device may determine if the second network device monitored the second response message by obtaining a notification from the second network device indicating whether the second network device determined that the second response message was sent from the first client device to the first network device. If the second network device determined that the second response message was sent from the first client device, the notification may also indicate the content of the second response message. The content of the second response message may indicate whether the first client device is sending at least one data packet to the first network device.

In one embodiment, the first network device may determine that it did not receive the second response message from the first client device. The first network device may also determine that the second network device did not monitor the second response message from the first client device. The first network device may then deauthenticate the first client device.

In another embodiment, the first network device may determine that it did not receive the second response message from the first client device. The first network device may also determine that the second network device did monitor the second response message from the first client device. The first network device may also determine the content of the second response message that the second network device monitored.

In another embodiment, the first network device may determine that it did receive the second response message from the first client device.

When a second response message is received by the first network device, or the second network device monitored the second response message being sent from the first client device to the first network device, the first network device may further determine the contents of the second response message. In one embodiment, the contents of the second response message may indicate that the first client device is sending at least one data packet to the first network device. In another embodiment, the contents of the second response message may indicate that the first client device is not sending at least one data packet to the first network device.

When the first network device determines that it did not receive the first response message and the second response message from the first client device, proceed to instruction 412. When the first network device determines that it did receive the first response message, or the second response message, indicating that the first client device is sending at least one data packet to the first network device, proceed to instruction 412. When the first network device determines that it did receive the first response message, or the second response message, indicating that the first client device is not sending at least one data packet to the first network device, the first network device may proceed to instruction 408.

At instruction 412, the hardware processor(s) 402 may execute machine-readable/machine-executable instructions stored in the machine-readable storage media 404 to determine a failure count. The failure count may be associated with the first client device. The failure count may indicate the number of failed attempts in receiving data packets by the first network device from the first client device. When it is determined that a first response message or second response message is received from the first client device, the failure count may be reset to zero.

At instruction 414, the hardware processor(s) 402 may execute machine-readable/machine-executable instructions stored in the machine-readable storage media 404 to increase the failure count by one when determining no data packets have been received from the first client device. The first network device may determine if it receives at least one data packet from the first client device. If the first network device does receive at least one data packet from the first client device, the failure count may be reset to zero and the first network device may proceed to instruction 408. If the first network device does not receive at least one data packet from the first client device, the first network device may increase the failure count by one.

At instruction 416, the hardware processor(s) 402 may execute machine-readable/machine-executable instructions stored in the machine-readable storage media 404 to determine the failure count is greater than a failure count threshold. The failure count threshold may be an amount of attempts that a network device may allow a client device to fail at sending data packets to the network device. The failure count threshold may be preset or may vary according to a plurality of factors, including the type of client device, the type of network, the number of the plurality of client devices in the network, the amount of available resources in the network device, etc. Determining that the failure count is greater than the failure count threshold may indicate that there is an issue with the communication connection between the first network device and the first client device that needs to be fixed.

At instruction 418, the hardware processor(s) 402 may execute machine-readable/machine-executable instructions stored in the machine-readable storage media 404 to deauthenticate the first client device from the first network device when the failure count associated with the first client device is greater than a failure count threshold. In one embodiment, the failure count threshold may indicate the maximum total amount of attempts that a network device may allow a client device to fail at sending data packets to the network device. In another embodiment, the failure count threshold may indicate the maximum total amount of attempts that a network device may allow a client device to fail in succession since the last successful message was received by the network device from the client device. The first network device may deauthenticate the first client device by disconnecting the first client device.

Figure 5:
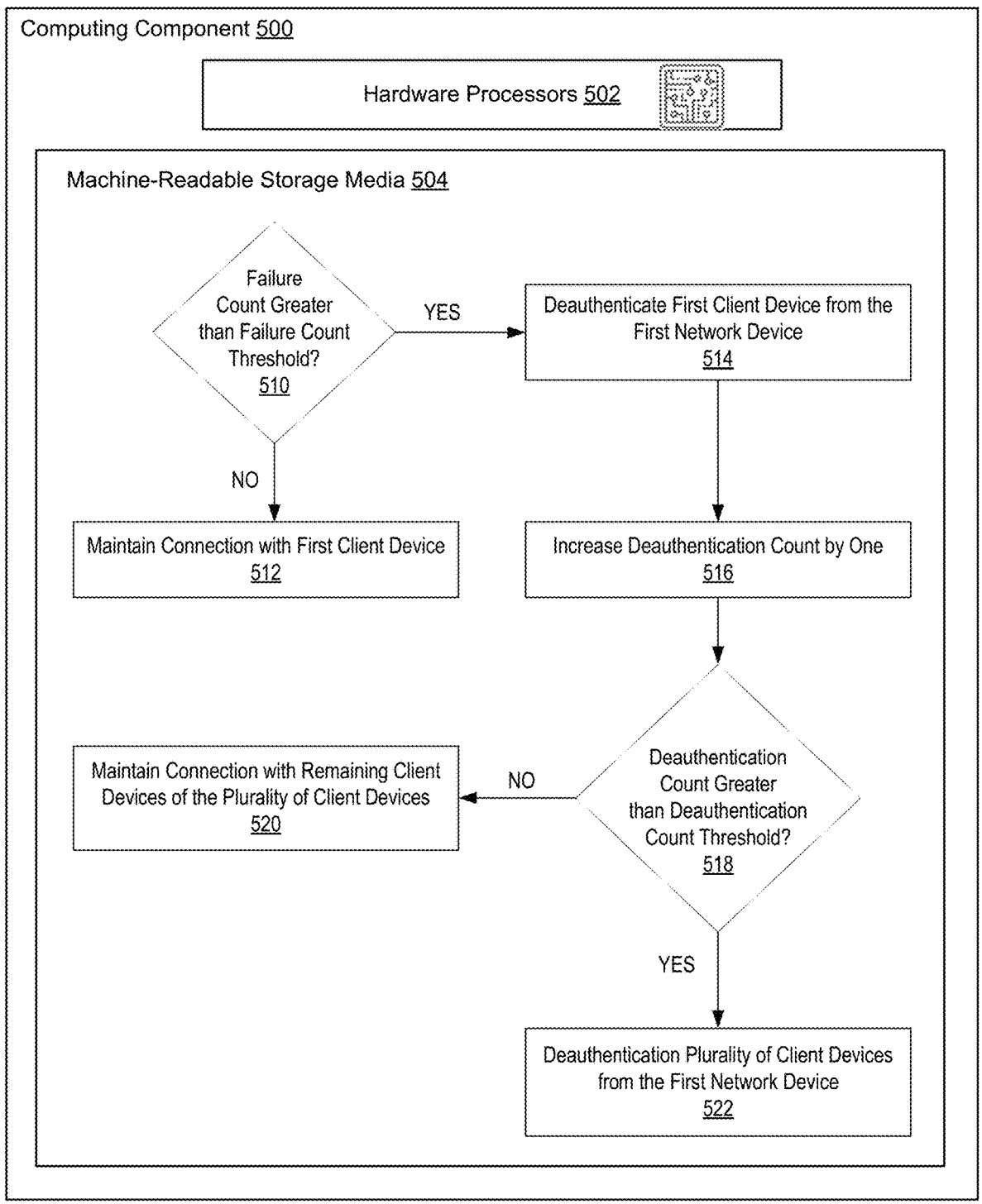
FIG. 5 is an illustration of a server determining whether a client device should be deauthenticated from a network device in accordance with various embodiments of the present disclosure.

FIG. 5 illustrates a computing component 500 that includes one or more hardware processors 502 and machine-readable storage media 504 storing a set of machine-readable/machine-executable instructions that, when executed, cause the hardware processor(s) 502 to perform an illustrative method of determining and resolving issues with communication connections between a network device and a client device. It should be appreciated that there can be additional, fewer, or alternative steps performed in similar or alternative orders, or in parallel, within the scope of the various examples discussed herein unless otherwise stated. The computing component 500 may be implemented as the server 110 of FIG. 1, FIG. 2, and FIG. 3, and computing component 400 of FIG. 4. FIG. 5 summarizes and further elaborates on some aspects previously described.

At instruction 510, the hardware processor(s) 502 may execute machine-readable/machine-executable instructions stored in the machine-readable storage media 504 to determine if the failure count is greater than the failure count threshold. The failure count may be associated with a first client device (e.g., any of the client devices illustrated in FIG. 1, FIG. 2, or FIG. 3). The failure count may indicate the number of failed attempts in receiving data packets by the first network device from the first client device. The failure count threshold may be preset or may vary according to a plurality of factors, including the type of client device, the type of network, the number of the plurality of client devices in the network, the amount of available resources in the network device, etc. If the failure count is determined to be greater than the failure count threshold, proceed to instructions 514. Otherwise, proceed to instructions 512.

At instruction 512, the hardware processor(s) 502 may execute machine-readable/machine-executable instructions stored in the machine-readable storage media 504 to maintain the connection with the first client device. When it is determined that the failure count is not greater than the failure count threshold, the first network device may maintain the communication connection with the first client device. Allowing the first network device to maintain the communication connection with the first client device may allow the first client device to correct any issues it may be having with sending data packets to the first network device before being deauthenticated from the first network device. The first network device may proceed with sending more messages to the first client device querying if the first client device is sending data packets to the first network device. The first client device may proceed with trying to send data packets to the first network device.

At instruction 514, the hardware processor(s) 502 may execute machine-readable/machine-executable instructions stored in the machine-readable storage media 504 to deauthenticate the first client device from the first network device. When it is determined that the failure count is greater than the failure count threshold, the first network device may deauthenticate the first client device. The first network device may deauthenticate the first client device by disconnecting the communication connection with the first client device. In one embodiment, the first network device may disconnect the first client device from a first radio of the first network device, where the first client device was connected to the first network device via the first radio. The first network device may include a plurality of radios that may be used to connect to a plurality of client devices. After the first network device disconnects the first client device from a first radio, the first network device may connect the first client device to a second radio of the first network device. In another embodiment, the first network device may disconnect the first client device. After the first network device disconnects the first client device, the first network device may connect the first client device to a second network device. The second network device may be neighboring network device that is in the same network as the first network device. The network may include a plurality of network devices, including the first and second network devices. The first client device may be able to connect to any of the plurality of network devices in the network.

At instruction 516, the hardware processor(s) 502 may execute machine-readable/machine-executable instructions stored in the machine-readable storage media 504 to increase the deauthentication count by one. After the first network device has deauthenticated the first client device, the deauthentication count may be increased by one. The deauthentication count may be associated with the first network device. The deauthentication count may indicate the number of client devices that have been deauthenticated from the first network device because of an issue with the communication connections between the first network device and the respective client devices.

At instruction 518, the hardware processor(s) 502 may execute machine-readable/machine-executable instructions stored in the machine-readable storage media 504 to determine if the deauthentication count is greater than a deauthentication count threshold. The deauthentication count threshold may be an amount of client devices that a network device may deauthenticate. The deauthentication count threshold may be preset or may vary according to a plurality of factors, including the type of client device, the type of network, the number of the plurality of client devices in the network, the amount of available resources in the network device, etc. Determining that the deauthentication count is greater than the deauthentication count threshold may indicate that there is an issue with the network device that affects its communication connections with client devices. If the deauthentication count is determined to be greater than the deauthentication count threshold, proceed to instruction 522. Otherwise, proceed to instruction 520.

At instruction 520, the hardware processor(s) 502 may execute machine-readable/machine-executable instructions stored in the machine-readable storage media 504 to maintain connections with remaining client devices of a plurality of client devices. The first network device may have communication connections with a plurality of client devices. The first client device may have been one of the plurality of client devices connected to the first network device. If the deauthentication count is not greater than the deauthentication count threshold, the first network device may maintain its communication connections with the remaining client devices of the plurality of client devices that are still connected to the first network device. Allowing the first network device to maintain the communication connections with the remaining client devices of the plurality of client devices may allow the first network device to correct any issues it may be having with sending and/or receiving messages and data packets with the remaining client devices.

At instruction 522, the hardware processor(s) 502 may execute machine-readable/machine-executable instructions stored in the machine-readable storage media 504 to deauthenticate the plurality of client devices from the first network device. When it is determined that the deauthentication count is greater than the deauthentication count threshold, the first network device may deauthenticate the plurality of client devices from it. In one embodiment, deauthenticating the plurality of client devices may include disconnecting the plurality of client devices from the first network device. The first network device may then connect the plurality of client devices to a second network device. The second network device may be neighboring network device that is in the same network as the first network device. The network may include a plurality of network devices, including the first and second network devices. The plurality of client devices may be able to connect to any of the plurality of network devices in the network, including the second network device.

After the plurality of client devices are disconnected from the first network device and connected to the second network device, a report may be generated. The report may indicate that there is an issue with the first network device and its ability to send and/or receive messages and data packets from client devices. The report may indicate that the first network device is malfunctioning. The report may also provide a summary of the issues that have occurred with the first network device with each of the client devices that it has deauthenticated. The report may also provide feedback as to what may be causing the issues. The report may also provide feedback as to possible solutions to solving the issues. After a report is generated, the report may be sent to a network administrator. The network administrator may use the report to address and fix any issues with the first network device. The network administrator may also use the report to prevent issues occurring with other network devices.

Figure 6:
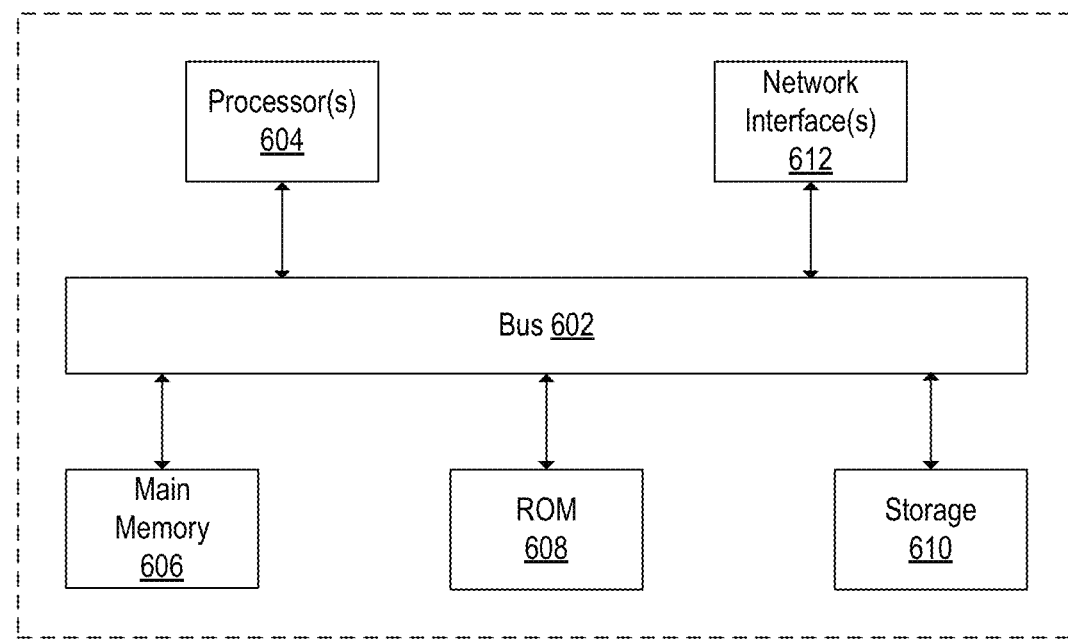
FIG. 6 illustrates a block diagram of an example computer system in which various embodiments of the present disclosure may be implemented.

FIG. 6 illustrates a block diagram of an example computer system in which various examples of the present disclosure may be implemented. The computer system 600 can include a bus 602 or other communication mechanism for communicating information, one or more hardware processors 604 coupled with the bus 602 for processing information. The hardware processor(s) 604 may be, for example, one or more general purpose microprocessors. The computer system 600 may be an example of a client-server communication or similar device.

The computer system 600 can also include a main memory 606, such as a random access memory (RAM), cache and/or other dynamic storage devices, coupled to the bus 602 for storing information and instructions to be executed by the hardware processor(s) 604. The main memory 606 may also be used for storing temporary variables or other intermediate information during execution of instructions by the hardware processor(s) 604. Such instructions, when stored in a storage media accessible to the hardware processor(s) 604, render the computer system 600 into a special-purpose machine that can be customized to perform the operations specified in the instructions.

The computer system 600 can further include a read only memory (ROM) 608 or other static storage device coupled to the bus 602 for storing static information and instructions for the hardware processor(s) 604. A storage device 610, such as a magnetic disk, optical disk, or USB thumb drive (Flash drive), etc., can be provided and coupled to the bus 602 for storing information and instructions.

Computer system 600 can further include at least one network interface 612, such as a network interface controller module (NIC), network adapter, or the like, or a combination thereof, coupled to the bus 602 for connecting the computer system 600 to at least one network.

In general, the word "component," "modules," "engine," "system," "database," and the like, as used herein, can refer to logic embodied in hardware or firmware, or to a collection of software instructions, possibly having entry and exit points, written in a programming language, such as, for example, Java, C or C++. A software component or module may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices, such as the computing system 600, may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of an executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques or technology described herein using customized hard-wired logic, one or more ASICs or FPGAS, firmware and/or program logic which in combination with the computer system 600 that causes or programs the computer system 600 to be a special-purpose machine. According to one or more examples, the techniques described herein are performed by the computer system 600 in response to the hardware processor(s) 604 executing one or more sequences of one or more instructions contained in the main memory 606. Such instructions may be read into the main memory 606 from another storage medium, such as the storage device 610. Execution of the sequences of instructions contained in the main memory 606 can cause the hardware processor(s) 604 to perform process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. The non-volatile media can include, for example, optical or magnetic disks, such as the storage device 610. The volatile media can include dynamic memory, such as the main memory 606. Common forms of the non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The non-transitory media is distinct from but may be used in conjunction with transmission media. The transmission media can participate in transferring information between the non-transitory media. For example, the transmission media can include coaxial cables, copper wire and fiber optics, including the wires that comprise the bus 602. The transmission media can also take a form of acoustic or light waves, such as those generated during radio-wave and infra-red data communications.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another, or may be combined in various ways. Different combinations and subcombinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method performed by a first network device of a plurality of network devices in a network, the method comprising:
   sending, to a first client device of a plurality of client devices, a query message requesting a response indicating if the first client device is sending at least one data packet to the first network device, wherein the first client device is connected to the first network device;
   determining a first response message is received from the first client device;
   determining a failure count indicating the number of failed attempts in sending data packets from the first client device to the first network device;
   increasing the failure count by one when determined no data packets have been received from the first client device;
   determining the failure count is greater than a failure count threshold; and
   deauthenticating the first client device from the first network device when the failure count is greater than a failure count threshold.

2. The computer-implemented method of claim 1, wherein a network device of the plurality of network devices comprises an access point, router, switch, or gateway.

3. The computer-implemented method of claim 1, wherein the plurality of client devices are connected to the first network device.

4. The computer-implemented method of claim 1, wherein the determining the first response message is received comprises:
   receiving, from the first client device, the first response message; and
   determining the first response message indicates that the first client device is sending at least one data packet to the first network device.

5. The computer-implemented method of claim 1, wherein the determining the first response message is received comprises:
   determining no response message was received from the first client device
   sending, to a second network device of the plurality of network devices, a request to monitor the first client device;
   resending, to the first client device, the query message; and
   determining a second response message is received from the first client device.

6. The computer-implemented method of claim 5, wherein the determining a second response message is received from the first client device comprises:
   determining the second response message is not received by the first network device;
   determining the second response message is monitored by the second network device; and
   determining the second response message indicates that the first client device is sending at least one data packet to the first network device.

7. The computer-implemented method of claim 5, wherein the determining a second response message is received from the first client device comprises:
   determining the second response message is not received by the first network device;
   determining the second response message is not received by the second network device; and
   deauthenticating the first client device from the first client device.

8. The computer-implemented method of claim 5, wherein the determining the second response message is received from the first client device comprises:
   receiving, from the first client device, the second response message; and determining the second response message indicates that the first client device is sending at least one data packet to the first network device.

9. The computer-implemented method of claim 1, wherein the failure count is reset to zero when determined at least one data packet has been received from the first client device.

10. The computer-implemented method of claim 1, wherein deauthenticating the first client device comprises:
disconnecting the first client device from a first radio of the first network device, wherein the first network device comprises a plurality of radios; and
connecting the first client device to a second radio of the first network device.

11. The computer-implemented method of claim 1, wherein deauthenticating the first client device comprises:
disconnecting the first client device from the first network device; and
connecting the first client device to a network device of the plurality of network devices.

12. The computer-implemented method of claim 1, further comprising:
increasing a deauthentication count by one when the first client device is deauthenticated from the first network device, wherein the deauthentication count indicates the number of client devices deauthenticated from the first network device.

13. The computer-implemented method of claim 12, further comprising:
determining the deauthentication count is greater than a deauthentication count threshold;
disconnecting the plurality of client devices from the first network device;
connecting the plurality of client devices to a network device of the plurality of network devices;
generating a report indicating that the first network device is malfunctioning; and
sending the report to a network administrator.

14. A computing system comprising:
a first network device of a plurality of network devices;
a first client device of a plurality of client devices;
one or more processors; and
a memory storing instructions that, when executed by the one or more processors, cause the one or more processors to:
send, from the first network device to the first client device, a query message requesting a response indicating if the first client device is sending at least one data packet to the first network device, wherein the first client device is connected to the first network device;
determine a first response message is received by the first network device from the first client device;
determine a failure count indicating the number of failed attempts in sending data packets from the first client device to the first network device;
increasing the failure count by one when determined no data packets have been received by the first network device from the first client device;
determine the failure count is greater than a failure count threshold; and
deauthenticate the first client device from the first network device when the failure count is greater than a failure count threshold.

15. The computing system of claim 14, wherein the determine the first response message is received comprises:

receive, by the first network device from the first client device, the first response message; and
determine the first response message indicates that the first client device is sending at least one data packet to the first network device.

16. The computing system of claim 14, wherein the determining the first response message is received comprises:
determine no response message was received from the first client device;
send, to a second network device of the plurality of network devices, a request to monitor the first client device;
resending, from the first network device to the first client device, the query message;
determine a second response message is received from the first client device, wherein the second response message indicates that the first client device is sending at least one data packet to the first network device.

17. The computing system of claim 14, wherein deauthenticating the first client device comprises:
disconnect the first client device from a first radio of the first network device; and
connecting the first client device to a second radio of the first network device.

18. The computing system of claim 14, wherein deauthenticating the first client device comprises:
disconnecting the first client device from the first network device; and
connecting the first client device to a network device of the plurality of network devices.

19. The computing system of claim 14, wherein the instructions further cause the processors to:
increase a deauthentication count by one when the first client device is deauthenticated from the first network device, wherein the deauthentication count indicates the number of client devices deauthenticated from the first network device;
determine the deauthentication count is greater than a deauthentication count threshold;
disconnect the plurality of client devices from the first network device;
connect the plurality of client devices to a network device of the plurality of network devices;
generate a report indicating that the first network device is malfunctioning; and
send the report to a network administrator.

20. A non-transitory storage medium storing instructions that, when executed by at least one processor of a server, cause the server to perform a method comprising:
sending, from a first network device to a first client device, a query message requesting a response indicating if the first client device is sending at least one data packet to the first network device, wherein the first client device is connected to the first network device;
determining a first response message is received by the first network device from the first client device;
determining a failure count indicating the number of failed attempts in sending data packets from the first client device to the first network device;
increasing the failure count by one when determined no data packets have been received by the first network device from the first client device;
determining the failure count is greater than a failure count threshold; and deauthenticating the first client device from the first network device when the failure count is greater than a failure count threshold.

\* \* \* \* \*